Nov. 18, 1969  E. J. EVANS  3,478,604

ELECTRONIC SOLID-STATE ACCELEROMETER

Filed May 17, 1968

INVENTOR.
EDGAR J. EVANS
BY: Harry M. Saragovitz,
Edward J. Kelly,
Herbert Berl &
J. Dubroff  ATTORNEYS.

United States Patent Office 3,478,604
Patented Nov. 18, 1969

3,478,604
ELECTRONIC SOLID-STATE ACCELEROMETER
Edgar J. Evans, Parsippany, N.J., assignor to the United States of America as represented by the Secretary of the Army
Filed May 17, 1968, Ser. No. 730,188
Int. Cl. G01p *15/08*
U.S. Cl. 73—517
4 Claims

ABSTRACT OF THE DISCLOSURE

A tapered cantilever beam composed of P-type silicon is mounted to lie in a plane substantially at a right angle to the direction of motion of a body, such as a flight vehicle, and receives stress or pressure at its tip end which is applied by a movable ball weight. On each face side of the beam is an N-type epitaxial resistor wired into a circuit configuration to form a unijunction transistor. The flexing of the beam serves to vary the resistors in an opposite sense and to control a transistor connected into a relaxation oscillator circuit. The operation is such that the period of oscillation is varied linearly by the acceleration force applied to the end of the beam by the ball weight. A resistor-capacitor form of differentiating circuit produces a pulse at the end of each cycle of oscillation which is read by a pulse counter.

Figure 1:
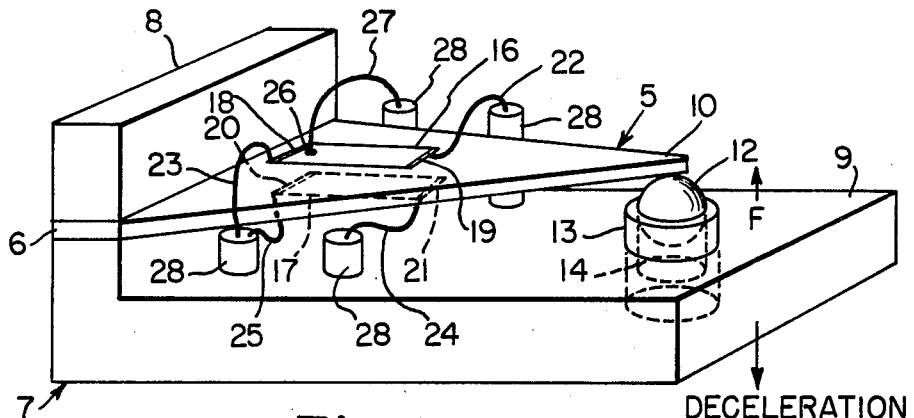

The invention described herein may be manufactured, used, and licensed by or for the Government for government purposes without the payment to me of any royalty thereon.

The present invention relates to accelerometers of the electronic solid-state type, and has for a primary object to provide a device of that type, the electrical output of which consists of electrical pulses or pulse signals spaced at intervals, that is, in frequency, and determined by an applied acceleration force. Furthermore, in accordance with the invention, a change in pulse period is linear with changes in input acceleration or deceleration.

A further object of the present invention is to provde a electronic solid-state accelerometer which is particularly adapter for use in the measurement of deceleration of a flight vehicle, such as a projectile, after undergoing launching or firing shock environment, with little or no degradation of performance.

A still further object of this invention is to provide a device of the character referred to, which is of simplified construction, and which is capable of being manufactured at low cost.

An accelerometer device of the type provided in accordance with the invention, is adapted to deliver a pulsed output or frequency variable signal representing acceleration during the time of motion of a projectile or flight vehicle with typical applications such as: (1) Transducing acceleration vs. time, or velocity vs. time of a projectile after firing; (2) Providing data for computing impact force vs. time of projectile striking targets; (3) Providing a safing and arming transducer for projectiles that may withstand high shock environments.

In accordance with a preferred embodiment of the invention, a tapered or triangular canti-lever beam is positioned or mounted to lie in a plane substantially at a right angle to the axis of acceleration and deceleration of a body in motion and is fixed at the base end in a suitable supporting means. At the tip end a force is applied for flexing the beam on the flight axis by a movable ball weight which is supported in a socket element in the supporting means.

The beam is a thin strip of P-type silicon, preferably having a resistivity of 10 ohm-centimeter and carries two rectangular strips providing resistor elements thereon on opposite faces or sides adjacent to the base and lying along the axis of the beam centrally thereof so that the two elements face each on the opposite side of the beam. These elements are N-type epitaxial resistors of high resistivity and are each provided with only ohmic contacts at both ends. One resistor is provided near one end with an injecting contact which is formed by alloying an aluminum doped dot into the resistor. These two components are then connected together serially to form a unijunction transistor type cantilever beam.

The resistors are piezo resistors whereby their resistance is dependent on the strain applied thereto as by flexing of the beam under the force of acceleration or deceleration inparted thereto by the moving ball. The triangular shape of the beam creates a uniform strain of equal magnitude but of opposite sign on the surfaces of the beam and this strain is then used to change the resistence values of the resistors. The two resistors are connected with a transistor device to form a unijunction relaxation oscillator and with a pulse forming network to derive from the flexing of the beam and relative change of resistance of the resistors, a pulse output the period of oscillation or pulse rate of which is changed linearly with the force applied to the ball weight. Thus the device is used to indicate the rate or force of acceleration or deceleration applied to the device.

The invention will be further understood from the following description when considered with reference to the accompanying drawing, and its scope is defined by the appended claims.

Figure 2:
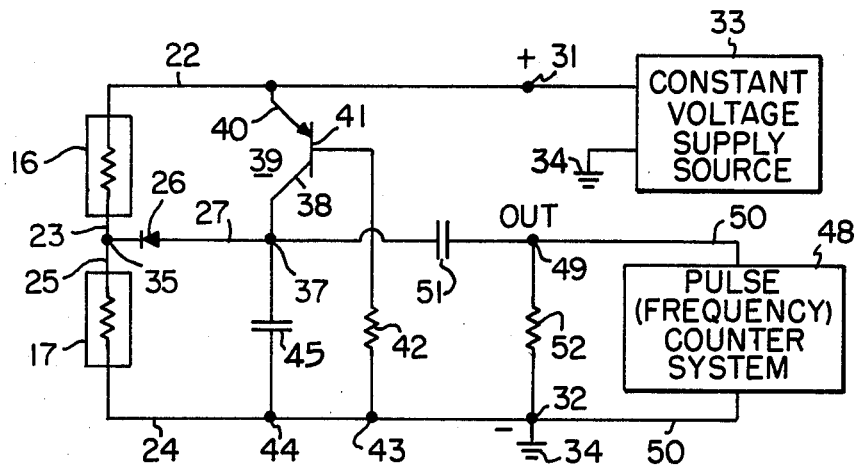

In the drawing,

FIG. 1 is a view, in perspective, of an electronic solid-state accelerometer device embodying the invention, and FIG. 2 is a circuit diagram showing the circuit connections and operation for the device of FIG. 1.

Referring to the drawing, wherein like reference characters are used to designate like parts and circuit elements, and referring particularly to FIG. 1, 5 is a relatively thin flexible canti-lever beam of tapered or triangular shape and constructed of p-type silicon. The beam is fixedly mounted at its base end 6 in a suitable supporting structure or base 7 to which it is clamped as by a block 8 to extend in spaced parallel relation to a surface 9 of the base as indicated. The main or 100 crystal axis is oriented down the axis of the beam or triangle, and the beam is preferably of the equilateral triangular type having a tapered free movable tip end 10 against which a force F is applied in the direction of the arrow to cause it to flex or bend in response to deceleration of a vehicle or the like by which it may be carried.

The force is applied by a movable mass or ball element 12 which is carried in a tubular guide or socket member 13 mounted in the base 7 to extend above the surface 9 in close proximity to the end of the lever 5 so that the ball 12 may contact and move the tip 10 in response to a deceleration force applied to the base as indicated by the second arrow directly below the first. The ball moves in a socket 14 in the tubular guide 13 along the acceleration axis for a short distance sufficient to withdraw from contact with the beam end 10 during periods of acceleration, in the present case, so that the socket is of sufficient depth for this action as indicated in the drawing. It is obvious that the device may be used to flex the beam by movement of the ball or mass in response to acceleration applied in the same direction as the deceleration in the present example.

On each face or side of the triangular or tapered beam 5, and near the base, are applied two n-type epitaxial resistors 16 and 17, of elongated rectangular shape, as thin films on the surfaces of the P-type silicon and located such that the axis of each resistor on the silicon beam 15 substantially directly opposite the other, that is the resistors are positioned facing each other, as indicated in the drawing and aligned directly on the axis. Each end of each resistor is provided with ohmic contacts, those for the resistor 16 being indicated at 18 and 19, and those for the resistor 17 being indicated at 20 and 21 respectively. These contacts are provided with lead out wires indicated at 22 and 23 for the resistor 16, and 24 and 25 for the resistor 17. At one end of the resistor 16 an injecting contact 26 as a diode is formed thereon by alloying an aluminum-doped dot into the resistor and this is provided with a leadout wire 27. In the present example, and to provide for free operation of the cantilever beam 5, in connection with the control elements 16 and 17 carried thereby, the output leads therefrom are flexible and preferably carried through suitable insulated leadout tubes 28, as indicated, which extend through the base.

Referring now to FIG. 2 along with FIG. 1, it will be seen that the resistor components as described, may be connected into a circuit configuration which forms effectively a unijunction type transistor mounted on the P-type triangular beam 5. The resistors are piezo resistive, that is, the resistance is dependent on the strain applied to them. Since the deflecting beam is of P-type silicon material and the elongated rectangular resistor elements are of the N-type and epitaxially related thereto, the resulting construction is such that with positive strain or stretching, the resistance increase. In the present example, the applied range of strain may change the value of each resistor element as much as 10 percent.

Considering now the force F applied to the end 10 of the beam 5, if this force is upward as depicted in FIG. 1, the beam is caused to deflect or bend upwardly, thereby compressing the resistor 16 and stretching or extending the resistor 17. In other words the top resistor receives a negative strain and the bottom resistor receives a positive strain. The triangular shape of the beam 5 creates a uniform strain of equal magnitude but of opposite sign on the surface of the beam. This strain is thus used to change the values of resistors 16 and 17.

Referring more particularly to FIG. 2, it will be seen that the resistors 16 and 17 are connected in series relation by joining the leads 23 and 25 and extending the leads 22 and 24 respectively to positive and negative supply terminals 31 and 32. These terminals are, in turn, connected with a constant voltage supply source as indicated at 33, the connection with the terminal 32 being through a ground connection indicated at 34.

In this circuit, the two series-connected resistors 16 and 17 provide effectively the two resistor elements of a unijunction transistor with the rectifying contact elements provided by the diode device 26. This is shown schematically connected at the junction point 35 of the two resistors or of the two leads 23 and 25. The output lead 27 from the rectifier contact or diode 26 is connected through a terminal 37 with the collector 38 of a transistor current source device 39 of the PNP type. The emitter 40 of the transistor 39 is connected with the lead 22 and the base 41 is connected through a biasing resistor 42 to a terminal 43 on the lead 24 as shown in FIG. 2. Between the terminal 37 and a terminal 44 on the lead 24 there is connected a storage capacitor 45. Thus there is provided a unijunction transistor mounted on the P-type triangular or elongated tapered beam of P-type material such as silicon, and the unijunction transistor thus provided is connected with suitable biasing elements to provide a relaxation oscillator.

From a consideration of the circuit thus described it will be seen that the resistor elements 16 and 17 are connected in series across the voltage source 33 and the supply terminals 31 and 32. This direct-current source provides a voltage drop V through the resistors part of which is applied to the diode 26 at the terminal 35. If the force F is zero and the values of the resistors 16 and 17 are equal, then the voltage at the point 35 or the diode 26 is $V/2$. By varying the force F, the voltage at this point or at the diode 26 can be shifted by approximately 10 percent of the total voltage V and this change is linear with the force F to substantially 1 percent accuracy. The voltage at the point 35 or the diode 26 may be denoted by the symbol $V_b$, and this quantity may be varied in magnitude up to at least $\pm 10$ percent from the value of $V/2$ by the application of a force $\pm F$ at the point or tip 10 of the lever arm or beam 5.

In operation, the transistor 39 and the resistor 42 form a constant current source to linearly charge the storage capacitor 45. The voltage across the capacitor 45 may be denoted by the symbol $V_c$. The $V_c$ increases linearly until it is greater than $V_b$ at which time the capacitor 45 discharges through the unijunction transistor arm 17. After this charge has been depleted, the charging cycle commences again. If the capacitor 45, the resistor 41 and the voltage V are constant, the period of oscillation is linearly dependent on the voltage $V_b$. Thus since $V_b$ can be changed linearly by applying the force F on the beam 5 at the point 10, the period of oscillation can be changed linearly with the force F. Thus the output pulse rate or frequency is an indication of the acceleration or deceleration force or rate applied to the device through the axis of the ball 12 and the arm 10, that is, th eaxis of movement of the carrier.

A utilization device such as a pulse or frequency counter system as indicated at 48 is connected with an output terminal 49 and the ground terminal 32 through output leads 50. Between the terminal 37 and the output terminal 49 is connected a resistor 52 complementary thereto to provide a pulse differentiating circuit which prouces a spike at the end of each cycle of oscillation for application to the counter system 48.

Thus the ballistic or electronic solid-state accelerometer of the present example consists of the unijunction transistor circuitry and the transistor mounted on the spring member 5 of solid-state material of one type together with the epitaxial resistor elements of the opposite type mounted thereon. The spherical ball or mass 12 is constrained to move in the cylindrical cavity 14 of the guide 15 and to withdraw therein on setback force to relieve pressure on the beam tip 10. During deceleration, the ball 12 is free to roll up the constraining cavity 14 and exert a force on the beam 5 at the tip 10 which is proportional to the magnitude of the deceleration. As the beam is then bent upwardly by the deceleration force F the electrical circuit operates to vary the frequency of the output in proportion thereto to indicate the magnitude of the deceleration rate.

From the foregoing description it will be seen that the electronic solid-state type accelerometer of the present invention is of simple construction and capable of being manufactured at low cost. Furthermore, it is particularly adapted for use in the measurement of deceleration of a space vehicle such as a projectile, after undergoing launching or firing shock, with little or no degradation of performance.

I claim:
1. An electronic solid-state accelerometer comprising in combination,
an elongated relatively-thin tapered canti-lever beam of solid-state P-type material having a free tip end and a base end,
means for anchoring said base end including a frame element having a flat surface extending in substantially parallel relation to said beam, means providing a well in said surface of the frame element in alignment with said free beam end, a movable ball mass in said well for movement against said beam end in response to a deceleration movement of said device in a direction normal to the plane of said beam, a pair of epitaxial N-type resistor elements of elongated rectangular shape on the opposite faces of said beam adjacent to said base end and in alignment with the axis of said beam in opposed relation to each other, means providing ohmic contacts with the ends of said resistor elements and circuit means therefor connecting said resistor elements at adjacent ends in series relation as the elements of a unijunction type transistor configuration, means providing a rectifying contact on one of said elements as the rectifying contact of said unijunction type transistor configuration, a relaxation oscillator circuit connected with said resistors and said rectifying contact and including a transistor device having a base and emitter and collector electrodes, said oscillator circuit connections including a direct-current voltage supply source connected with the ends of said series connected resistor elements, a storage capacitor connected with the rectifying contact of said unijunction type transistor, means for charging said capacitor through the transistor device to a voltage greater than that of the rectifying contact, a resistance-capacitance differentiating circuit connected with said storage capacitor and including a series resistor element as an output coupling impedance element, and a pulse counter system connected with said resistor element.

2. An electronic solid-state accelerometer for flight vehicles and the like, comprising in combination, a thin tapered cantilever beam of P-type silicon mounted to lie in a plane substantially at a right angle to the direction of motion along a flight axis, a movable ball weight in contact with the beam end for applying a bending force thereto in response to movement along said axis, a pair of N-type epitaxial resistor elements mounted one on each face of said beam in opposed relation and with an injection contact on one of said elements to provide an effective unijunction transistor circuit with said elements connected in series relation with a direct current voltage supply source having positive and negative terminals, a relaxation oscillator circuit including a storage capacitor and a transistor device having a base connected with the negative terminal for bias and having an emitter-collector path connected serially between the positive terminal and the negative terminal through the storage capacitor and through the injection contact of said unijunction transistor circuit, means connected for deriving a pulse output from said storage capacitor, and means connected therewith for counting the pulse output.

3. An electronic solid-state accelerometer comprising in combination, a mounting fixture providing a base, a relatively-thin triangular beam of single-crystal P-type silicon having a free tip end and a fixed base end connected with said mounting fixture with the main crystal axis oriented down the axis of the triangle, a movable ball mass carried by the base for movement against said beam tip end in response to a deceleration movement of said base and device in a direction normal to the plane of the beam, a pair of epitaxial N-type resistor elements of elongated rectangular shape secured to the opposite faces of said beam in alignment with said axis of the beam in opposed relation to each other, direct-current constant voltage supply means having positive and negative terminals connected therewith, means providing ohmic contacts with the ends of said resistor elements for circuit connection therewith, circuit means connecting said resistor elements on series relation between said terminals as the elements of a unijunction transistor circuit configuration, means providing a rectifying contact between the end contacts on one of said resistor elements as the rectifying contact of said unijunction transistor circuit configuration, a relaxation oscillator circuit connected with said resistor elements and said rectifying contact and including a transistor device having a base and emitter and collector electrodes, said base being connected with said negative supply terminal through a base resistor with said emitter electrode connected with the positive supply terminal and the collector electrode connected with said rectifying contact, a storage capacitor connected between said rectifying contact and the negative supply terminal for charging said capacitor through the emitter-collector path of the transistor oscillator, a series resistance-capacitance differentiating circuit connected between said storage capacitor and the negative supply terminal, and pulse counter means connected with the resistor element thereof.

4. An electronic solid-state accelerometer comprising in combination, a mounting fixture providing a flat base, a triangular relatively-thin tapered canti-lever beam of P-type silicon with the main axis oriented down the triangle axis to a free tip from a base end, means for anchoring said base end to said fixture with an upper surface of the fixture extending in parallel relation to said beam, means providing a well in said surface in alignment with said beam tip, a movable ball mass in said well for movement against said beam tip in response to a deceleration movement of said fixture and device in a direction normal to the plane of said beam, a pair of epitaxial N-type resistor elements of elongated rectangular shape aligned with said beam axis on opposite faces of said beam in opposed relation to each other, said resistors being piezo-resistive and oppositely changable in resistance in response to flexing of said beam, means providing ohmic contacts with the ends of said resistor elements and circuit means therefor connecting said resistor elements in series relation as the elements of a unijunction transistor means, means providing a rectifying contact on one of said elements between the terminal ends thereof to provide the rectifying contact of said unijunction transistor, a relaxation oscillator circuit connected with said resistors and said rectifying contact and including a transistor device having a base and emitter and collector electrodes said circuit connections including a direct-current voltage supply source having positive and negative terminals connected with the ends of said series connected resistors and through a base bias resistor from the negative terminal to the transistor base, a storage capacitor connected between said rectifying contact and the negative supply terminal, means for charging said capacitor through the transistor device including a connection for the emitter with the positive supply terminal and a connection for the collector with the capacitor and the rectifying contact, a resistance-capacitance differentiating circuit connected with said storage capacitor and including a series resistor element, and a pulse counter system connected with said resistor element.

References Cited

UNITED STATES PATENTS 3,049,685 8/1962 Wright _____ 73—88.5
3,304,787 2/1967 Chiku et al. _____ 73—517

JAMES J. GILL, Primary Examiner
H. GOLDSTEIN, Assistant Examiner